United States Patent [19]

Hamada et al.

[11] Patent Number: 4,864,108

[45] Date of Patent: Sep. 5, 1989

[54] APPARATUS FOR RECORDING TRANSACTIONS AND A RECORDING METHOD THEREFOR

[75] Inventors: Yasunori Hamada; Kousuke Noda, both of Tsuchiura; Junichi Oizumi, Ibaraki; Takao Terayama, Ushiku; Toru Hayama, Kashiwa; Haruo Yamanaka, Seto, all of Japan

[73] Assignee: Hitachi Ltd., Tokyo, Japan

[21] Appl. No.: 66,205

[22] Filed: Jun. 25, 1987

[30] Foreign Application Priority Data

Jun. 25, 1986 [JP] Japan ................................ 61-146921

[51] Int. Cl.4 ............................................. G06F 15/30

[52] U.S. Cl. .................................... 235/379; 235/380; 235/454

[58] Field of Search ........................ 235/379, 454, 380

[56] References Cited

U.S. PATENT DOCUMENTS

| | | | |
|---|---|---|---|
| 3,383,657 | 5/1968 | Claasen | 235/380 |
| 4,136,821 | 1/1979 | Suguira | 235/454 |
| 4,205,780 | 6/1980 | Burns | 235/454 |
| 4,464,733 | 8/1984 | Misker | 235/379 |

*Primary Examiner*—Harold I. Pitts

*Attorney, Agent, or Firm*—Antonelli, Terry & Wands

[57] ABSTRACT

A user or a customer manipulates a banking machine to withdraw the cash or to deposit the cash. The user or the customer manipulates the input device of a transaction equipment and inserts a transaction medium such as cash card in the transaction equipment. The transaction equipment then operates to pick up the image data for confirming the user himself, the image data of the transaction medium, and the transaction data as electronic image data which will then be recorded onto a recording medium such as a video tape or an optical disc.

33 Claims, 3 Drawing Sheets

APPARATUS FOR RECORDING TRANSACTIONS AND A RECORDING METHOD THEREFOR

BACKGROUND OF THE INVENTION

1. FIELD OF THE INVENTION

The present invention relates to an apparatus for recording transactions in a banking machine such as ATM, CD and AD, and to a recording method therefor. More particularly, the invention relates to an apparatus for recording transactions that is adapted to recording the data of transactions as electronic data and to a recording method therefor.

2. DESCRIPTION OF THE PRIOR ART

In an apparatus for recording transactions in a banking machine, the imprint of embossed characters imparted to a transaction medium such as cash card and the like issued by a bank and the transaction data are printed and recorded on a journal paper, such that the transactions are recorded and a slip can be issued to the user. Further, the user of the transaction medium such as cash card or the like is confirmed relying upon a personal identification number. The technology of this character has been disclosed, for example, in U.S. Pat. No. 4,266,122.

According to the above-mentioned conventional technology which employs papers or sheets such as journal papers as a transaction recording medium, no consideration has not been given in regard to replenishing the papers or sheets, replenishing the papers or sheets during the non-attended operations particularly on holidays, and arranging and storing the recorded papers or sheets, without contributing to saving the manpower.

Further, though the inprint of embossed characters imparted to the transaction medium such as cash card and the transaction data are printed and recorded, no consideration has been given to recording the data for specifying the user. Therefore, if the transaction medium such as cash card or the like is stolen and the personal ID number recorded in the magnetic tape is decoded, it may be used illegally. That is, the recording on the journal paper only is not often helpful for specifying the unauthorized user. To cope with this, an observation camera is installed in a site where the banking machine is installed. When the camera is installed on the side, however, the face of the user is not clearly picked up. Moreover, the recorded picture is erased after a predetermined period of time has passed or, when an endless tape is used, after the tape has turned once, making it difficult to specify the user.

According to another conventional technology disclosed, for example, in Japanese Patent Laid-Open No. 168275/1981, provision is made of an imaging device which generates image signals of the user in response to the execution of a transaction, and the image of the user is printed on the journal paper as a record of transaction based upon image signals from the imager. In the above technology which records the face of the user as a record of transaction data, investigation can be carried out quickly in case an unauthorized transaction is performed. Like the conventional technology mentioned earlier, however, the above technology records the data of transaction on the journal paper without giving consideration to replenishing the papers or sheets, replenishing the papers or sheets during the non-attended operation particularly on holidays, and arranging and storing the recorded papers or sheets.

SUMMARY OF THE INVENTION

The object of the present invention is to process data in large amounts at high speeds by treating the data of transactions as electronic data, and recording the electronic data on an electronic recording medium.

According to the present invention, at least the image data of the transaction medium and the transaction data are recorded onto a recording medium such as a video tape, among three kinds of data consisting of image data for specifying the user who utilizes the banking machine, image data of the transaction medium such as a cash card with which the transaction is performed, and the transaction data.

By recording the image data of the transaction medium such as a cash card with which the transaction is performed, the transaction medium can be specified. By recording the transaction data, furthermore, details of transaction can be known. As required, furthermore, the image data of the face of the user who utilizes the banking machine may be recorded so that the user who has executed the transaction can be specified.

The above-mentioned three kinds of data recorded on a video tape can be easily checked on another day, making it possible to process the data in large amounts at high speeds.

DESCRIPTION OF THE PREFERRED EMBODIMENTS

Figure 1:
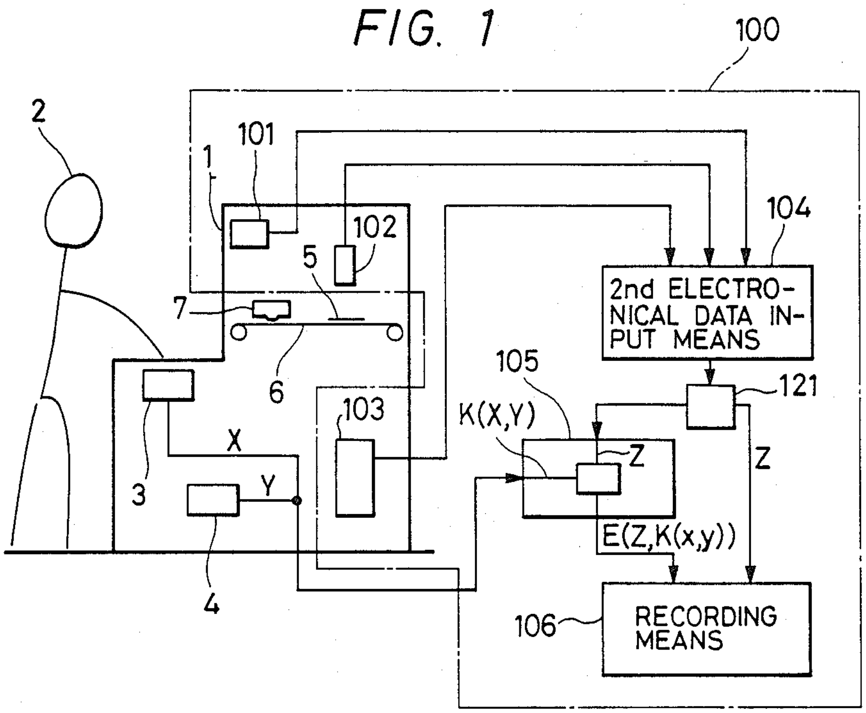
FIG. 1 is a diagram illustrating the structure of an apparatus for recording transactions in a banking machine according to an embodiment of the present invention.

An apparatus for recording transactions of a banking machine according to an embodiment of the present invention will now be explained in conjunction with FIG. 1. The banking machine is comprised of an operation display unit that works as an interface for the users, a cash processing unit for processing cash such as of deposits or withdrawals, a passbook handling subsystem for printing on a passbook, a medium processing unit for processing the data of a transaction medium such as a cash card or the like, and a control unit which controls the above-mentioned units and the external units. Here, however, FIG. 1 illustrates only those portions of the banking machine 1 that are directly related to the present invention, but does not illustrate other portions.

Input means 3 such as a keyboard or a touch panel in the operation unit of the banking machine 1 is manipulated by a user 2 who is a customer to input data specific to the customer such as a personal identification number and the like for specifying the transaction data or the customer. Transaction terminal specifying means 4 has its own data such as an identification number for branch or a number specific to the apparatus by which the banking machine 1 can be specified. The transaction medium such as cash card or passbook is taken into the machine by carrier means 6, and from which the data recorded therein are read out by a sensor 7.

A transaction recording device 100 surrounded by a dot-dash line is comprised of first image data pick-up means 101 which picks up image data of, for example, a face and convert them into electronic data so that the user 2 can be specified, second image data pick-up means 102 which picks up image of the transaction medium 5 and converts them into electronic data, first electronic data gaining means 103 which picks up the transaction data and converts them into electronic data, second electronic data gaining means 104 which receives three kinds of image data from the first image data pick-up means 101, from the second image data pick-up means 102 and from the first electronic data gaining means 103, and which combines them into one image data, encryption means 105 which encrypts an output signal Z of the second electronic data gaining means 104, recording means 106 which records the output signal Z of the second electronic data gaining means 104 and/or the encrypted signal E of the encryption means 105 onto a recording medium 107, signal switching means 121 which switches the output signal Z of the second electronic data gaining means 104 onto the side of the encryption means 105 or onto the side of the recording means 106.

The above-mentioned first image data pick-up means 101 and the second image data pick-up means 102 may be comprised of a video camera or a line sensor that can pick up image data.

The first electronic data gaining means 103 generates characters based upon the transaction data such as the date of transaction, code of the branch, code of the user, transaction amount, and the like, and converts them into video signals. For this purpose, the first electronic data gaining means 103 includes a character generator and a video signal converter.

The second electronic data gaining means 104, according to this embodiment, combines three kinds of image data together to prepare a picture, and performs the same processing as the superimpose picture processing of, for example, a TV picture.

The encryption means 105 encrypts the output signal Z of the second electronic data gaining means 104 relying upon a function K(X, Y) obtained by the combination of data X specific to the customer, such as personal identification number for specifying the customer input through input means 3 in the operation unit of the banking machine 1, and data Y of a combination of a branch number for specifying the apparatus and serial numbers of the apparatuses sent from means for specifying the transaction terminal. The encryption means 105 then produces the encrypted data, i.e., produces a signal E(Z, K(X, Y)). Namely, relying upon, for example, the function K(x,y), the encryption means 105 produces the encrypted signal E(Z, K(x,y)) for encrypting the image by changing the order of scanning lines of the image formed by the output signals Z from the second electronic data gaining means 104. The encryption means 105 does not produce encrypted signal E when the signal Z is zero, i.e., when no signal is input to the encryption means 105 from the second electronic data gaining means 104.

Figure 2:
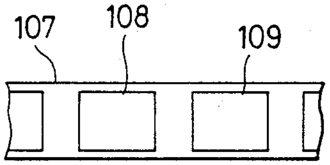
FIG. 2 is a diagram illustrating recording areas of transaction data to be recorded on a medium for recording transactions.
Figure 3:
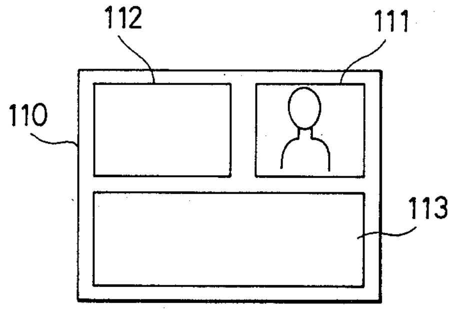
FIG. 3 is a diagram showing a reproduced picture in one of the recording areas of FIG. 2.

FIG. 2 shows the recording medium 107 used in the recording means 106, and FIG. 3 illustrates the structure of a picture produced onto a display screen in response to the signals Z.

In FIG. 2, the recording medium 107 is the one on which will be recorded by the recording means 106 the data sent from the second electronic data gaining means 104 and from the encryption means 105. When the recording means is a VTR device, the recording medium 107 will be a video tape. The signal Z directly sent from the second electronic data gaining means 104 is recorded onto a recording area 108 of the recording medium 107, and the signal E(Z, K(X, Y)) sent from the encryption means 105 is recorded onto the recording area 109 of the recording medium 107. In this embodiment, the two recording areas are located adjacent to each other. If the two areas can be distinguished over the other, however, there exists no particular limitation in regard to the positions of the recording areas and the medium. A picture 110 of FIG. 3 represents the structure of a picture obtained when the signal Z recorded in the recording area 108 is produced onto the display screen. The picture 110 consists of a partial picture 111 based upon the image data of the user 2 picked up by the first image data pick-up means 101, a partial picture 112 based upon the image data of the transaction medium 5 picked up by the second image data pick-up means 102, and a partial picture 113 based upon the transaction data picked up by the first electronic data gaining means 103. In the second electronic data gaining means 104, the data are so combined together that a plurality of partial pictures are shown on one screen when the recorded data are reproduced.

The signal switching means 121 may, for example, be a single pole double through switch or a single pole triple throw switch. When the single pole double throw switch is employed, the switching means is usually connected to the side of the recording means 106. After the signal Z is recorded onto the recording medium 107 by the recording means 106, the switching means is connected to the side of the encryption means 105 in response to a record completion signal from the recording means 106. When the single pole triple throw switch is used, the switching means is usually located at a neutral position, and is switched to the side of the recording means 106 in response to an image formation completion signal sent from the second electronic data gaining means 104. After the signal Z has been recorded onto the recording medium 107 by the recording means 106, the switching means is switched to the side of the encryption means 105 in response to the record completion signal from the recording means 106. After the encrypted signal E has been recorded onto the recording medium 107 by the recording means 106, the switching means is switched again to the neutral position by the record completion signal from the recording means 106.

Figure 4:
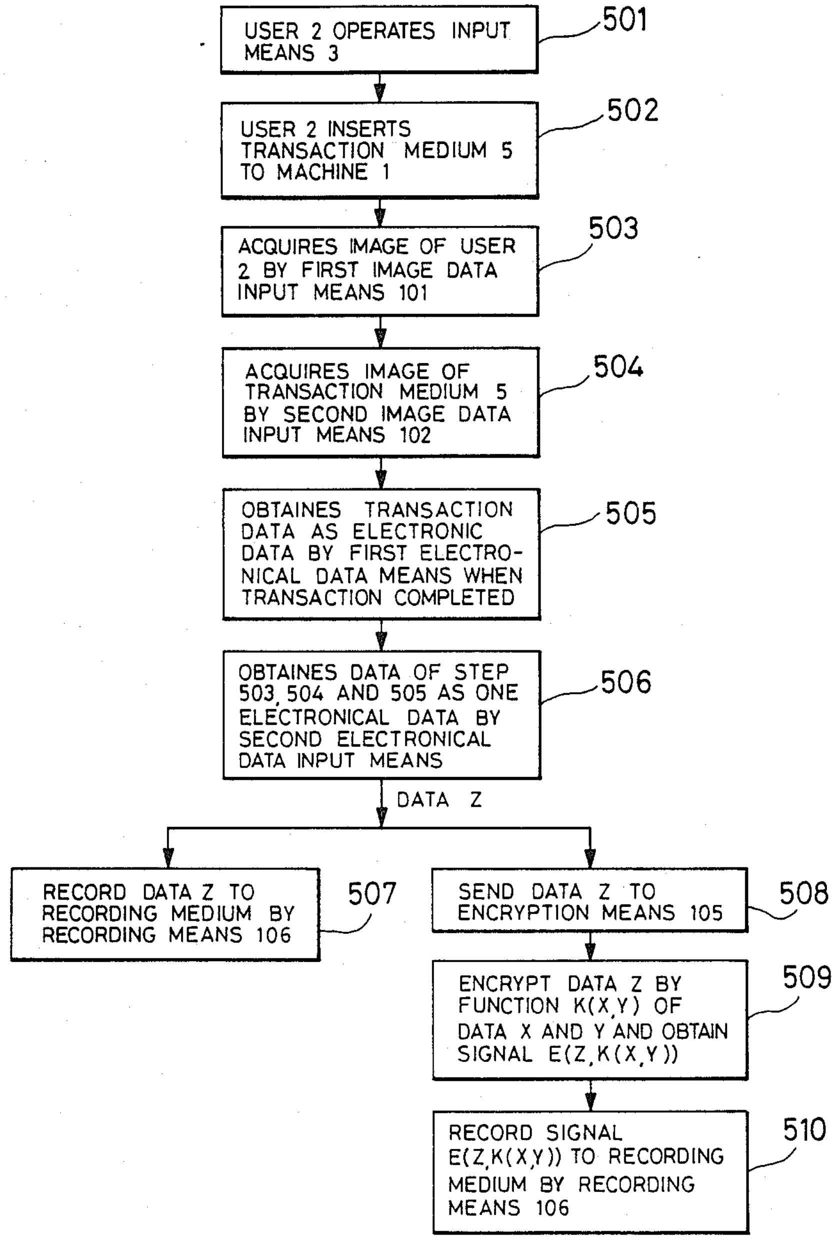
FIG. 4 is a flow chart for explaining the operation according to the embodiment of FIG. 1.

Operation of the embodiment shown in FIGS. 1, 2 and 3 will now be described in conjunction with a flow chart of FIG. 4.

The user 2 who is a customer who utilizes the banking machine 1 manipulates the input means (step 501) to select the transaction, or inserts the transaction medium 5 such as cash card in the banking machine (step 502). Then, the first image data pick-up means 101 picks up the image data of the user 2 (step 503), and the second image data pick-up means 102 picks up the image data of the image data of the transaction medium 5 (step 504). At a moment when the transaction is agreed or not, the transaction data are converted by the first electronic data gaining means 103 into electronic data (step 505), and the thus obtained transaction data are sent to the second electronic data gaining means 104 which combines together the data that are separately input to form one electric data (step 506).

The output signal Z consisting of data combined by the second electronic data gaining means 104 is directly sent to the recording means 106 owing to the switching operation of the signal switching means 121, and is recorded onto the recording medium 107 (step 507). The output signal Z is sent to the encryption means 105 (step 508) based upon the switching operation of the signal switching means 121.

The encryption means 105 encrypts the output signal Z which is the data sent from the second electronic data gaining means 104 in compliance with a function K(X, Y) of data X specific to the user, such as a personal identification number for specifying the user, and a combination of a branch number given to the banking machine 1 and serial numbers of the apparatuses, or specific data such as arbitrary numbers determined by the branch. The encryption means 105 then obtains a signal E(Z, K(X, Y)) which is the encrypted data (step 509). The encrypted signal E(Z, K(x, y)) is sent to the recording means 106 and is recorded onto the recording medium 107 (step 510). The signals Z and E are recorded onto the recording areas 108 and 109 of the recording medium 107 adjacent to each other as shown, for example, in FIG. 2.

When a VTR device is used as the recording means 106 as contemplated in this embodiment, a video tape which is the recording medium 107 is set to the VTR device to reproduce the data consisting of signals Z and E recorded in the predetermined recording areas of the recording medium 107. For example, the recorded data of signal Z recorded in the recording area 108 of the recording medium 107 is reproduced on the display screen as shown in FIG. 3.

In the above-mentioned embodiment, the signal E is recorded after the signal Z is recorded onto the recording medium 107 by the recording means 106. The order of recording, however, may be changed by reversing the switching operation of the signal switching means 121. Further, when the recording heads are separately provided to record the signals Z and E onto the recording medium 107, these signals can be recorded simultaneously. Either one of the signals Z and E may be recorded onto the recording medium 107, instead of recording both of them. The second electronic data gaining means 104 generates a signal for obtaining one image data by combining three kinds of data, i.e., by combining image data specific to the user sent from the first image data pick-up means 101, image data of the transaction medium 5 sent from the second image data pick-up means 102, and transaction data from the first electronic data gaining means 103. Here, however, the image data specific to the user 2 may be excluded.

According to the above-mentioned embodiment, the image data of a transaction medium such as cash card for executing the transaction and the transaction data are recorded as electronic data without using papers or sheets such as journal papers. Furthermore, the data of large amounts can be recorded at high speeds. Therefore, the recording medium needs be replenished in small amounts, and the arrangement and storage can be facilitated contributing to saving the manpower to a great extent.

As required, furthermore, the data for specifying the user who executed the transaction, such as the face of the user can be recorded, making it easy to specify the unauthorized user. Furthermore, employment of this method enhances the effect for preventing the burgling, and provides the customers who utilizes the banking machine with enhanced security.

Further, since the electronic data are encrypted and recorded by combining the number specific to the user and the number specific to the apparatus, it is virtually difficult to alter the recorded data and the security of the transaction recording apparatus can be improved.

In the above-mentioned embodiment, the output signal Z from the second electronic data gaining means 104 is encrypted by the encryption means 105 based upon the data X specific to the user and the data of means 4 which specifies the transaction terminal. The encryption mechanism, however, may be omitted. This makes it possible to reduce the amount of data and, more than that, to simplify the mechanical system. Moreover, the encryption means may be omitted when the data are to be recorded onto, for example, an optical disc (write only) in which it is impossible or difficult to rewrite the data.

Figure 5:
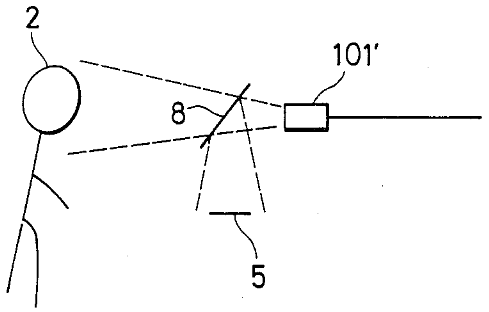
FIG. 5 is a diagram illustrating the structure of image pick-up means according to another embodiment.

Means for picking up the image data of the face of the user or of a transaction medium such as a card may further be provided with a mirror 8 as shown in FIG. 5, so that the image data of the transaction medium 5 such as cash card is picked up in parallel with the image of the face of the user 2. Namely, the two image data can be picked up by one image data pick-up means 101. The effects of the invention are not limited by any of the above-mentioned means for picking up the image data.

The same effects can also be obtained even when some of the first image data pick-up means 101 for picking up the image data of the face of the user 2, the second image data pick-up means 102 for picking up the image data of the transaction medium such as cash card, and the first electronic data gaining means 103 that converts the transaction data into electronic data, are incorporated in the banking machine as shown in FIG. 1, and other means are incorporated in a separate apparatus.

Figure 6:
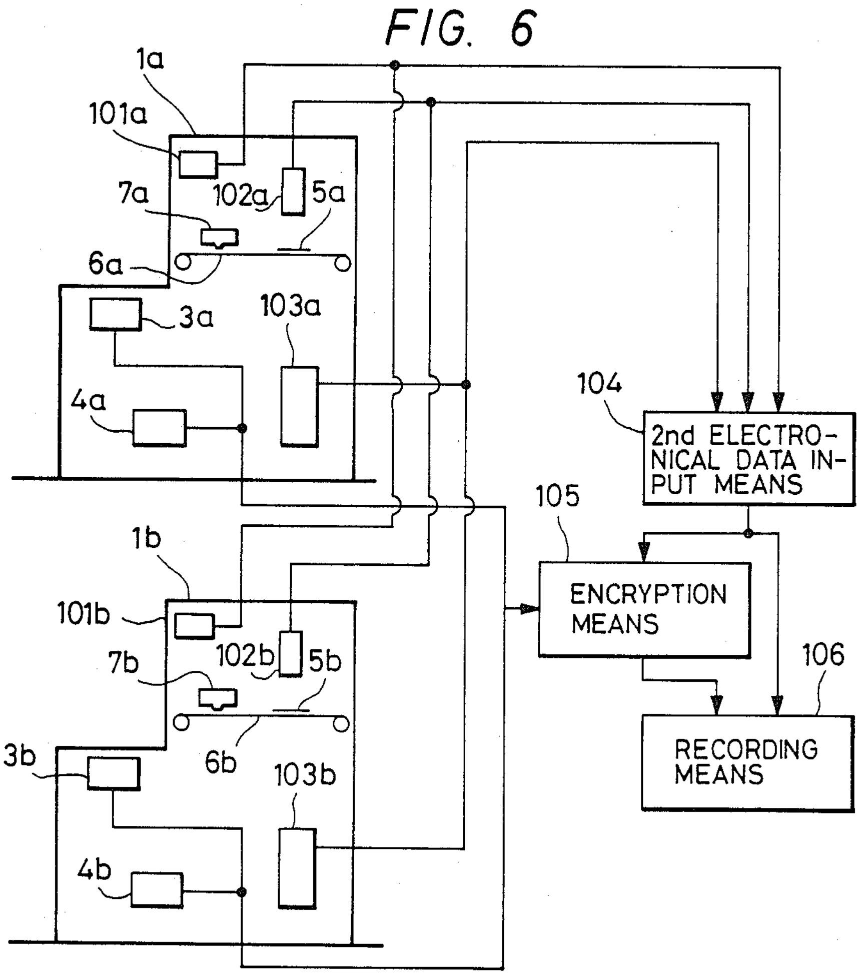
FIG. 6 is a diagram illustrating the structure of an apparatus for recording transactions of a plurality of banking machines according to a further embodiment of the present invention.

FIG. 6 illustrates another embodiment in which two banking machines are installed in parallel. The two banking machines 1*a* and 1*b* installed juxtaposed to each other have the same means as those of the banking machine 1 shown in FIG. 1, and the same portions as those of FIG. 1 are denoted by the same reference numerals followed by postscripts a and b.

The banking machine 1*a* has input means 3*a*, handling device specifying means 4*a*, means 6*a* for carrying transaction medium 5*a*, sensor 7*a*, first image data pick-up means 101*a*, second image pick-up means 102*a*, and first electronic data gaining means 103*a*.

Like the banking machine 1 shown in FIG. 1, the banking machine 1*b* too has input means 3*b*, handling device specifying means 4*b*, means 6*b* for carrying a transaction medium 5*b*, sensor 7*b*, first image pick-up means 101*b*, second image data pick-up means 102*b*, and first electronic data gaining means 103*b*.

Provision is further made of second electronic data gaining means 104, encryption means 105 and recording means 106, that are commonly used by the banking machines juxtaposed to each other. In FIG. 6, means denoted by the same reference numerals as those of FIG. 1 exhibit the same functions as those of FIG. 1. Being constructed as described above, means for recording the transactions can be placed under integrated management.

In the above-mentioned embodiments, the image data of the face of the user, the data of the medium such as cash card and the data related to the contents of transaction are combined together by the second electronic data gaining means 104 to form one electronic data. The present invention, however, needs not necessarily be limited thereto only, but the three kinds of data may be recorded onto recording media using separate recording means.

According to the present invention, the data related to transactions can be converted into electronic data and, as required, image for specifying the user can be picked up, without using papers or sheets and making it possible to record large amounts of data at high speeds.

Moreover, the transaction data based upon the numbers specific to the user and to the apparatus can be encrypted, and the data for specifying the user can be recorded at the same time, contributing to enhancing the security in recording the transaction data and in using the banking machine.

What is claimed is:

1. An apparatus for recording transactions which has transaction equipment provided with an operation display unit to be manipulated by a user, a cash processing unit and a transaction medium processing unit, the improvement comprising:

image data pick-up means for picking up image data of a transaction medium with which the transaction is agreed and for converting the image data into electronic data;

first electronic data gaining means for providing coded transaction data and having means for converting said coded transaction data into electronic image data; and recording means for recording data from electronic data gaining means onto a recording medium for storage and later retrieval.

2. An apparatus for recording transactions according to claim 1, wherein said data from said image data pick-up means and said data from said first electronic data gaining means are combined together by second electronic data gaining means to obtain a signal for gaining one image data which is to be recorded onto said recording medium.

3. An apparatus for recording transactions according to claim 1, wherein said data from said image data pick-up means and said data from said first electronic data gaining means are independently recorded onto a recording medium.

4. An apparatus for recording transactions according to claim 1, wherein said image data pick-up means for picking up the image data of a transaction medium and said first electronic data gaining means are arranged in the transaction equipment.

5. An apparatus for recording transactions which has transaction equipment provided with an operation display unit to be manipulated by a user, a cash processing unit and a transaction medium processing unit, the improvement comprising:

first image data pick-up means for picking up image data for specifying a user who manipulates said transaction equipment and for converting the image data into electronic data;

second image data pick-up means for picking up image data of a transaction medium with which the transaction is agreed and for converting the image data into electronic data;

first electronic data gaining means for providing coded transaction data and having means for converting said coded transaction data into electronic image data; and recording means for recording signals from said first and second image data pickup means and said first electronic data gaining means onto a recording medium.

6. An apparatus for recording transactions according to claim 5, wherein said data from said first image data pick-up means, said data from said second image data pick-up means, and said data from said first electronic data gaining means are combined together by second electronic data gaining means to obtain a signal for gaining one image data that will be recorded onto a recording medium.

7. An apparatus for recording transactions according to claim 5, wherein said data from said first image data pick-up means, said data from said second image data pick-up means, and said data from said first electronic data gaining means, are independently recorded onto a recording medium.

8. An apparatus for recording transactions according to claim 5, wherein said first image data pick-up means for picking up the image data for specifying the user, said second image data pick-up means for picking up the image data of the transaction medium, and said first electronic data gaining means for picking up the transaction data, are arranged in said transaction equipment.

9. An apparatus for recording transactions which has transaction equipment provided with an operation display unit to be manipulated by a user, a cash processing unit and a transaction medium processing unit, the improvement comprising:

image data pick-up means for picking up image data of a transaction medium with which the transaction is agreed and for converting the image data into electronic data;

first electronic data gaining means for providing coded transaction data and having means for converting said coded transaction data into electronic image data;

encryption means for encrypting said data from said image data pick-up means and said data from said first electronic data gaining means; and recording means for recording said data from said image data pick-up means and from said first electronic data gaining means and/or encrypted data from said encryption means onto a recording medium.

10. An apparatus for recording transactions according to claim 9, wherein said data from said image data pick-up means and said data from said first electronic data gaining means are combined together by second electronic data gaining means to obtain a signal for gaining one image data, and the thus combined data and/or data obtained by encrypting said combined data are recorded onto a recording medium.

11. An apparatus for recording transactions according to claim 9, wherein said data from said image data pick-up means and said data from said first electronic data gaining means and/or data obtained by encrypting data from said image data pick-up means and said first electronic data gaining means are independently recorded onto a recording medium.

12. An apparatus for recording transactions according to claim 9, wherein said image data pick-up means for picking up image data of a transaction medium and said first electronic data gaining means, are arranged in said transaction equipment.

13. An apparatus for recording transactions which has transaction equipment provided with an operation display unit to be manipulated by a user, a cash processing unit and a transaction medium processing unit, the improvement comprising:

first image data pick-up means for picking up image data for specifying a user who manipulates the transaction equipment;

second image data pick-up means for picking up image data of a transaction medium with which the transaction is agreed;

first electronic data gaining means for providing coded transaction data and having means for converting said transaction data into electronic image data;

encryption means for encrypting data from said first and second image data pick-up means and said first electronic data gaining means; and recording means which records data from said first and second image data pick-up means and said first electronic data gaining means and/or encrypted data from said encryption means onto a recording medium.

14. An apparatus for recording transactions according to claim 13, wherein said data from said first image data pick-up means, said data from said second image data pick-up means and said data from said first electronic data gaining means are combined together by second electronic data gaining means to obtain a signal for gaining one image data, and said combined data and/or data obtained by encrypting said combined data are recorded onto a recording medium.

15. An apparatus for recording transactions according to claim 13, wherein said data from said first image data pick-up means, said data from said second image data pick-up means and said data from said first electronic data gaining means and/or obtained by encrypting data from said first and second image pick-up means and said first electroic data gaining means, are independently recorded onto a recording medium.

16. An apparatus for recording transactions according to claim 13, wherein said first image data pick-up means, said second image data pick-up means, and said first electronic data gaining means are arranged in the transaction equipment.

17. An apparatus for recording transactions having transaction equipment provided with an operation display unit to be manipulated by a user, a cash processing unit, and a transaction medium processing unit, the improvement comprising:

first image data pick-up means for picking up image data of a transaction medium with which the transaction is agreed;

first electronic data gaining means for providing coded transaction data and having means for converting said coded transaction data into electronic image data; and encryption means for encrypting data input from at least said second image data pick-up means and from said first electronic data gaining means among data sent from said first and second image data pick-up means and said first electronic data gaining means;

wherein said encryption means inputs data from at least said second image data pick-up means and from said first electronic data gaining means among data sent from said first image data pick-up means, said second image data pick-up means and said first electronic data gaining means, and encrypts said data and produces said data as encrypted data.

18. An apparatus for recording transactions according to claim 17, wherein said input to said encryption means is encrypted based upon data specific to user and/or the data specific to the transaction equipment.

19. An apparatus for recording transactions which has transaction equipment provided with an operation display unit to be manipulated by a user, a cash processing unit, and a transaction medium processing unit, the improvement comprising:

image data pick-up means for picking up image data for specifying the user who manipulates the transaction equipment and the image data of a transaction medium, and for converting said image data into electronic data;

electronic data gaining means for providing coded transaction data and having means for converting said coded transaction data into electronic image data; and recording means for recording data from said image data pick-up means and data from said electronic data gaining means onto a recording medium.

20. A method of recording transactions in a transaction equipment provided with an operation display unit to be manipulated by a user, a cash processing unit and a transaction medium processing unit, said method comprising the steps of:

inserting, by a user, a transaction medium in the transaction equipment to execute the transaction;

picking up image data of the transaction medium by first electronic data gaining means and converting said coded transaction data into electronic image data at the time when the transaction is agreed; and recording data from said image data pick-up means and said first electronic data gaining means by recording means onto a recording medium.

21. A method of recording transactions according to claim 20, wherein said data from said image data pick-up means and said data from said first electronic data gaining means are sent to second electronic data gaining means and are so combined together as to obtain an image data, and said combined data is recorded by said recording means onto a recording medium.

22. A method of recording transactions according to claim 20, wherein said data from said image data pick-up means and said data from said first electronic data gaining means are independently recorded by said recording means onto a recording medium.

23. A method of recording transactions in a transaction equipment provided with an operation display unit to be manipulated by a user, a cash processing unit and a transaction medium processing unit, said method comprising the steps of:

starting operation of the transaction equipment;

picking up by first image pick-up means image data for specifying the user and converting said image data into electronic data;

picking up by second image data pick-up means image data of a transaction medium that is inserted in the transaction equipment by a user to execute a transaction and converting said coded transaction data into electronic data;

providing coded transaction data by first electronic data gaining means and converting into electronic image data at a time when the transaction is agreed; and recording data from said first and second image data pick-up means and said first electronic data gaining means onto a recording medium.

24. A method of recording transactions according to claim 23, wherein data from said first image data pick-up means, data from said second image pick-up means, and data from said first electronic data gaining means, are sent to second electronic data gaining means and are so combined together as to obtain an image data, and the combined data is recorded by said recording means onto a recording medium.

25. A method of recording transactions according to claim 23, wherein data from said first image data pick-up means, from said second image data pick-up means and from said first electronic data gaining means, are independently recorded by said recording means onto a recording medium.

26. A method of recording transactions in a transaction equipment provided with an operation display unit to be manipulated by a user, a cash processing unit an transaction medium processing unit, said method comprising the steps of:

inserting by a user, a transaction medium in a transaction equipment to execute a transaction;

pick-up image data of the transaction medium by image data pick-up means and converting said image data into electronic data;

providing transaction data by first electronic data gaining means and converting said coded transaction data into electronic image data at a time when the transaction is agreed;

sending data from said image data pick-up means and said first electronic data gaining means to data switching means recording data from said image data pick-up means and from said first electronic data gaining means by recording means onto a recording medium when said data switching means is connected to a side of the recording means; encrypting data from said image pick-up means and from said first electronic data gaining means by encryption means when said data switching means is connected to a side of the encryption means; and recording the encrypted data by said recording means onto a recording medium.

27. A method of recording transactions according to claim 26, wherein said data input to said encryption means is encrypted based upon data specific to the user and/or data specific to the transaction equipment.

28. A method of recording transactions according to claim 26, wherein said data from said image data pick-up means and said data from said first electronic data gaining means are sent to second electron data gaining means and are combined together so as to obtain an image data, said combined data is supplied to said recording means or to said encryption means by said data switching means, and the combined data or data obtained by encrypting the combined data are recorded by said recording means onto a recording medium.

29. A method of recording transactions according to claim 26, wherein said data from said image data pick-up means and said data from said first electronic data gaining means are switched to the side of said recording means or to the side of said encryption means by said data switching means, and said data from said image data pick-up means and said data from said first electronic data gaining means or data obtained by encrypting said data from said image data pick-up means and said data from said first electronic data gaining means are recorded by said recording means onto a recording medium.

30. A method of recording transactions in a transaction equipment provided with an operation display unit to be manipulated by a user, a cash processing unit and a medium processing unit, said method comprising the steps of:

starting by a user operation of the transaction equipment;

picking up by first image data pick-up means image data for specifying the user and converting said image data into electronic data; executing a transaction as the user inserts a transaction medium in the transaction equipment;

picking up by second image data pick-up means image data of the transaction medium and converting said image data into electronic data;

providing coded transaction data by first electronic data gaining means and converting into electronic data at a time when the transaction is agreed;

sending data from said first and second image data pick-up means and said first electronic data gaining means to data switching means;

recording, when said data switching means is connected to a side of recording means, data from said first image data pick-up means, from said second image data pick-up means and from said first electronic data gaining means by said recording means onto a recording medium; encrypting, when said signal switching means is connected to a side of encryption means, data from said first image data pick-up means, from said second image data pick-up means and from said first electronic data gaining means by encryption means; and recording the encrypted data by said recording means onto the recording medium.

31. A method of recording transactions according to claim 30, therein said data input to said encryption means is encrypted based upon data specific to the user and/or data specific to the transaction equipment.

32. A method of recording transactions according to claim 30, wherein said data from said first image data pick-up means, said data from said second image pick-up means and said data from said first electronic data gaining means, are sent to second electronic data gaining means and are so combined together as to obtain an image data, said combined data is supplied to the side of said recording means or to the side of said encryption means by said data switching means, and the combined data or data obtained by encrypting the combined data are recorded by said recording means onto a recording medium.

33. A method of recording transactions according to claim 30, wherein data from said first image data pick-up means, data from said second image data pick-up means and data from said first electronic data gaining means are connected to the side of said recording means or to the side of said encryption means by said data switching means, and said data or data obtained by encrypting said data are independently recorded by said recording means onto a recording medium.

* * * * *